US011044857B1

(12) United States Patent
Goodwin

(10) Patent No.: US 11,044,857 B1
(45) Date of Patent: Jun. 29, 2021

(54) PLANT TREATMENT SYSTEM

(71) Applicant: Robert Goodwin, Smithfield, RI (US)

(72) Inventor: Robert Goodwin, Smithfield, RI (US)

( * ) Notice: Subject to any disclaimer, the term of this patent is extended or adjusted under 35 U.S.C. 154(b) by 416 days.

(21) Appl. No.: 15/957,863

(22) Filed: Apr. 19, 2018

(51) Int. Cl.
  *A01G 31/00* (2018.01)
  *A01G 31/02* (2006.01)
  *A01G 29/00* (2006.01)

(52) U.S. Cl.
  CPC ............ *A01G 31/02* (2013.01); *A01G 29/00* (2013.01)

(58) Field of Classification Search
  CPC .. A01G 31/02; A01G 29/00; A01G 2031/006; A01G 27/003; A01G 27/005; A01G 27/006; A01G 27/02; A01G 27/06; A01G 9/24; A01G 9/246; A01G 9/247; A01G 9/14; A01G 9/18; A01G 9/26; A01G 7/045; A01G 7/02; A01G 31/06; A01G 27/001; A01G 27/00; A01G 9/02; Y02P 60/21
  See application file for complete search history.

(56) References Cited

U.S. PATENT DOCUMENTS

| 8,327,580 | B2* | 12/2012 | Miyahara | A01G 9/16 47/60 |
| 10,681,877 | B1* | 6/2020 | Goodwin | A01G 9/26 |
| 2014/0115958 | A1* | 5/2014 | Helene | A01G 31/06 47/17 |
| 2014/0318012 | A1* | 10/2014 | Fujiyama | A01G 31/02 47/62 R |
| 2016/0044879 | A1* | 2/2016 | Hamlin | A01G 31/02 47/62 R |
| 2017/0156275 | A1* | 6/2017 | Yano | A01G 22/00 |
| 2017/0208759 | A1* | 7/2017 | Yano | A01G 7/00 |
| 2018/0007845 | A1* | 1/2018 | Martin | A01G 9/246 |
| 2018/0325038 | A1* | 11/2018 | Spiro | A01G 27/001 |
| 2019/0323253 | A1* | 10/2019 | Benvie | A01G 9/247 |
| 2019/0335692 | A1* | 11/2019 | Speetjens | F03B 13/00 |
| 2020/0137964 | A1* | 5/2020 | Bouchard | A01G 31/047 |

* cited by examiner

*Primary Examiner* — Trinh T Nguyen
(74) *Attorney, Agent, or Firm* — Gulf Coast Intellectual Property Group

(57) ABSTRACT

A plant treatment system configured to provide improved growth for hydroponically grown plants. The plant treatment system includes an air treatment apparatus that is configured to provide temperature controlled and sterilized air to the root ball of a plant. The air treatment apparatus includes an air pump operable to draw air in from the surroundings and move through the air treatment apparatus. The air treatment apparatus includes an air ionizer and a dehumidifier wherein the air from the air pump passes through both. A temperature control unit provides the ability to control the temperature of the air as the air exits the air treatment apparatus. The air treatment apparatus further includes an oxygen concentrator that is operable to provide an air flow exiting from the air treatment apparatus that has a higher oxygen concentration. A dosing unit to deliver liquid nutrients is further included.

11 Claims, 3 Drawing Sheets

PLANT TREATMENT SYSTEM

FIELD OF THE INVENTION

The present invention relates generally to a plant treatment system, more specifically but not by way of limitation, a plant treatment system that is configured to provide conditioned air to the root system of a plant wherein the plant treatment system is operable to effect air parameters such as but not limited to ionization, temperature, humidity and oxygen concentration.

BACKGROUND

Horticulture is the science and art of growing plants. In order to be successful in the field of horticulture one must have a broad knowledge base about the various parameters that can influence plants during their growing cycle. Optimization of these parameters can lead to a more successful plant life cycle and production wherein the plant can produce larger blooms, grow in various climates and have a health status that is generally improved. Utilizing an indoor atmosphere allows a grower to control the climate and ultimately can lead to better plant production if the grower understands the impact of parameters such as but not limited to air quality and moisture. The ability to influence air quality and moisture that is introduced to a plant can lead to a much more successful harvest. will produce a harvestable crop.

One issue with indoor plant growing is the maintenance of a feeding the plant during a plants various growth stages. Most plants go through various growth stages wherein the requirements of water and nutrients often vary during these growth stages. As plants transition through the growth stages it is important for a grower to introduce the proper amounts of air, water, light and nutrients. One parameter, air, is very critical throughout most of the lifecycle of the plant. A proper amount of air directed onto the root system of the plant can have a significant impact on the growth of the plant. Air quality can play a critical role in the success of the growth of the plant. Air quality parameters such as but not limited to temperature, humidity, and ion charge should ideally be controlled in order to provide desirable air to a plant during its lifecycle.

Accordingly, there is a need for a plant treatment system that is operable to provide air to the root system of a plant wherein the plant treatment system is configured to provide operational control of air quality parameters such as but not limited to temperature, humidity and oxygen concentration.

SUMMARY OF THE INVENTION

It is the object of the present invention to provide a plant treatment system that is operable to provide air to the root system of a plant during its lifecycle wherein the air provided has improved quality.

Another object of the present invention is to provide a plant treatment system configured to introduce air proximate a root system of a plant wherein the plant treatment system includes a housing having an interior volume.

A further object of the present invention is to provide a plant treatment system operable to provide air of improved quality to plants during their lifecycle that further includes at least one air pump disposed within the interior volume of the housing.

Still another object of the present invention is to provide a plant treatment system configured to introduce air proximate a root system of a plant that further includes a air ionizer disposed within the interior volume of the housing that is configured to ionize the air prior to its discharge from the housing.

An additional object of the present invention is to provide a plant treatment system operable to provide air of improved quality to plants during their lifecycle that further includes a dehumidifier wherein the dehumidifier is operably coupled to the air pumps and air ionizer and is configured to control the moisture content of the air output from the plant treatment system.

Yet a further object of the present invention is to provide a plant treatment system configured to introduce air proximate a root system of a plant wherein the housing further includes an air intake vent that is operably coupled to the air pump.

An alternate object of the present invention is to provide a plant treatment system operable to provide air of improved quality to plants during their lifecycle wherein the interior volume of the housing further has disposed therein an air temperature control unit that is configured to provide cooling and/or heating of the air in order to produce an air output at a desired temperature.

Another object of the present invention is to provide a plant treatment system configured to introduce air proximate a root system of a plant that further includes an oxygen concentrator wherein the oxygen concentrator is placed on the exterior of the housing proximate the air intake vent.

Yet a further object of the present invention is to provide a plant treatment system operable to provide air of improved quality to plants during their lifecycle that further includes at least one air output line wherein the air output line is operably coupled to a root support apparatus.

An additional object of the present invention is to provide a plant treatment system configured to introduce air proximate a root system of a plant that further includes a dosing unit wherein the dosing unit is operably coupled to the root support apparatus and is configured to provide liquid nutrients thereto.

Another object of the present invention is to provide a plant treatment system operable to provide air of improved quality to plants during their lifecycle that further includes sensors and gauges operable to monitor and display air quality parameters such as moisture level and temperature.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
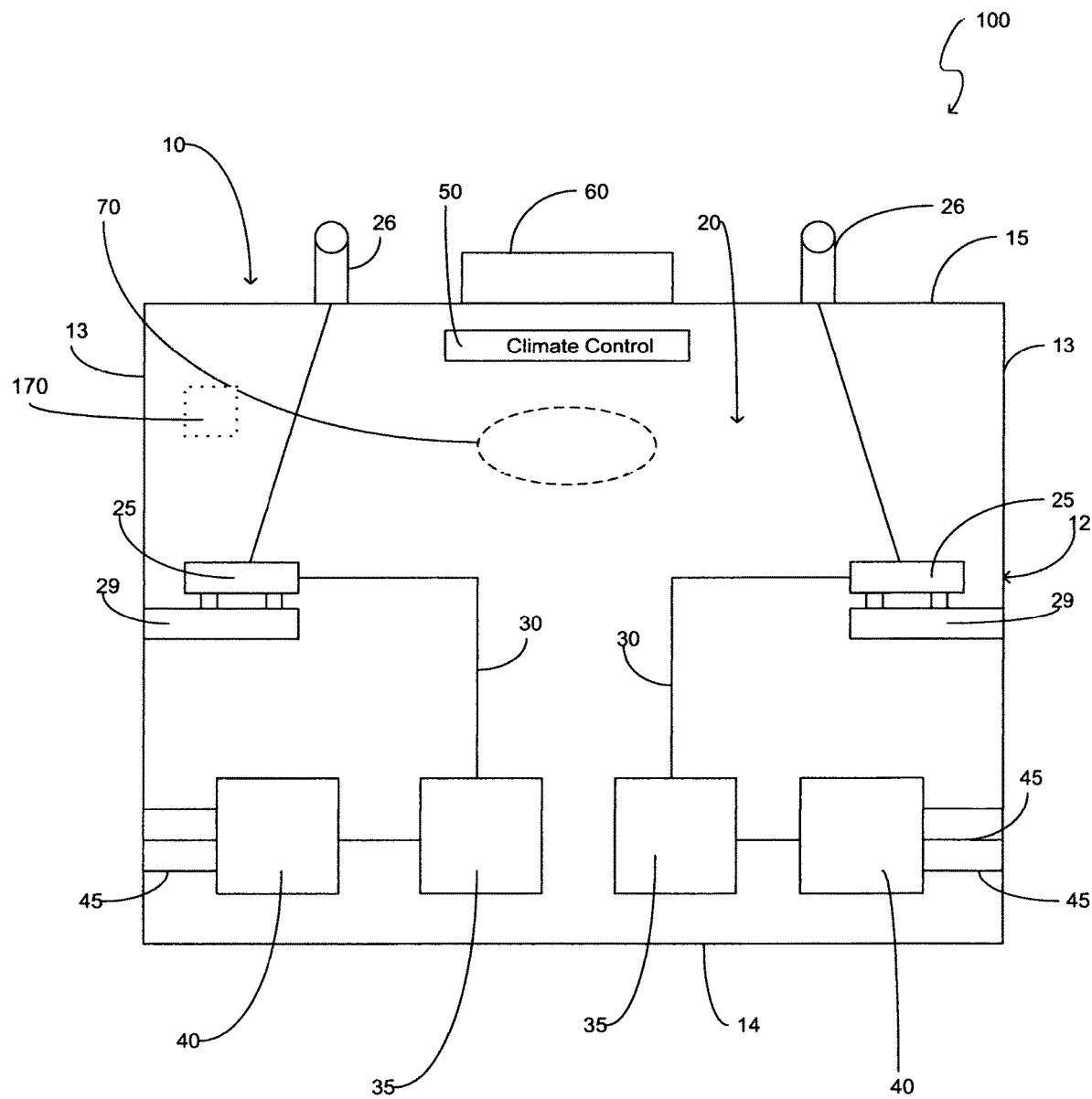
FIG. 1 is a diagrammatic view of the air treatment apparatus of the plant treatment system.
Figure 2:
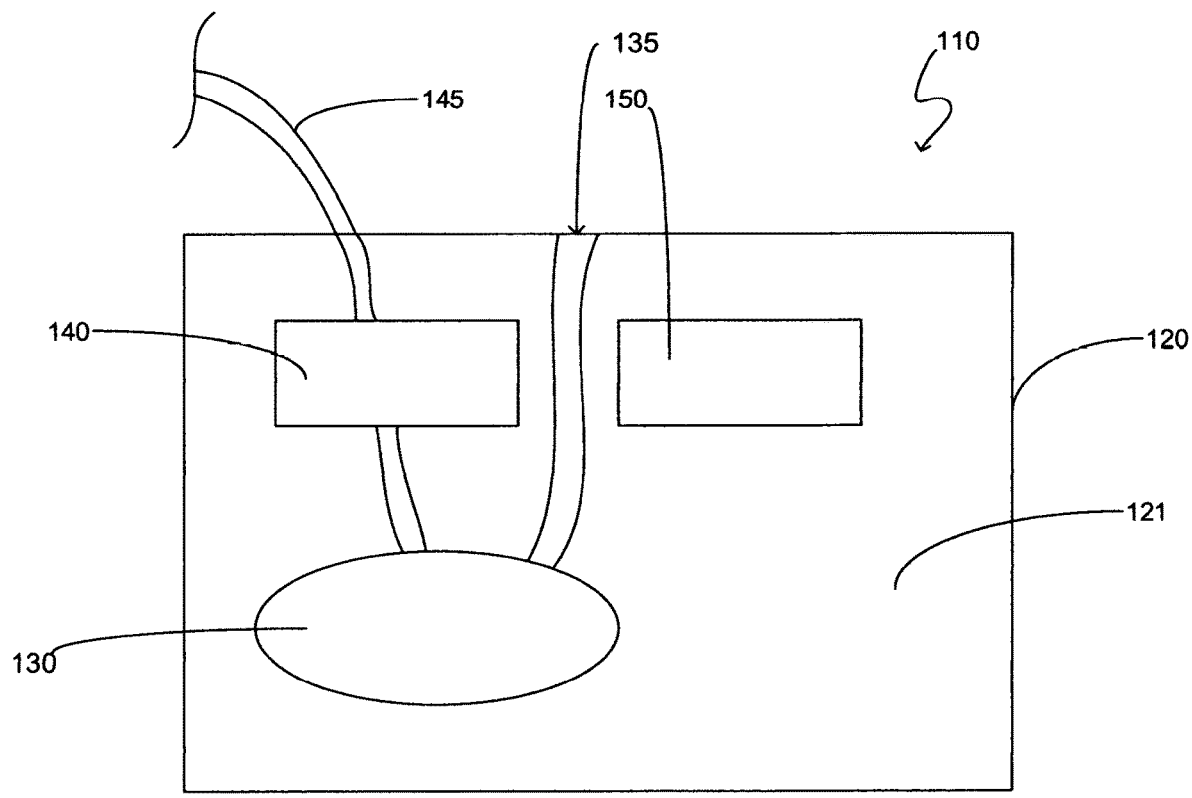
FIG. 2 is a diagrammatic view of the dosing unit of the present invention.
Figure 3:
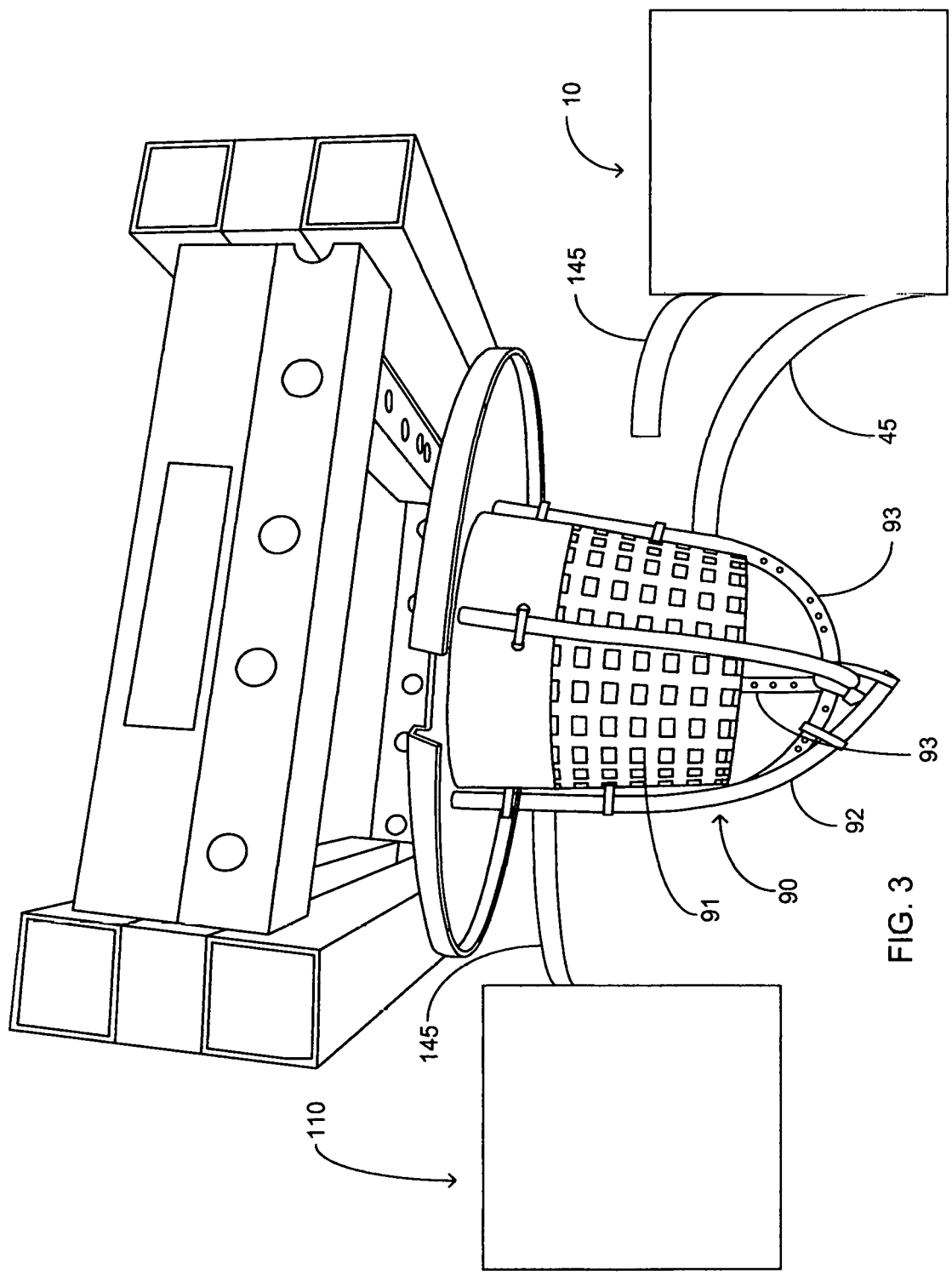
FIG. 3 is a schematic view of the dosing unit and air treatment apparatus operably coupled to the root support apparatus.

Referring now to the drawings submitted herewith, wherein various elements depicted therein are not necessarily drawn to scale and wherein through the views and figures like elements are referenced with identical reference numerals, there is illustrated a plant treatment system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1, the air treatment apparatus 10 includes a housing 12 that is manufactured from a durable rigid material such as but not limited to plastic or metal. The air treatment apparatus 10 includes a plurality of walls 13, a bottom 14 and a top 15 integrally formed to create an interior volume 20. The air treatment apparatus 10 is operably coupled to the root support system 90 and is configured to provide air of improved quality to the root support apparatus 90 so as to enhance the growth of the plant during the lifecycle thereof. The air treatment apparatus 10 includes air pumps 25 secured within the interior volume 20 of the housing 12. The air pumps 25 are operably coupled to the air intake vents 26 wherein the air pumps 25 are configured to receive air therefrom. The air pumps 25 are conventional air pumps having a reciprocating cylinder configured to draw air in from the air intake vents 26 and subsequently distribute outward to hose 30 for further processing as will be discussed herein. The air pumps 25 are mounted to support shelves 29 wherein the mounting of the air pumps 25 to support shelves 29 is executed in a manner so as to reduce vibrations within the housing 12. It is contemplated within the scope of the present invention that the air pumps 25 could be mounted so as to reduce vibrations utilizing numerous conventional techniques such as but not limited to rubber isolation mounts. While two air pumps 25 are illustrated herein, it is contemplated within the scope of the present invention that the air treatment apparatus 10 could have more or less than two air pumps.

The air pumps 25 are operably coupled to the ionizer 35. The ionizer 35 is a conventional air ionizer that is configured to provide treatment of the air received from the air pumps via hose 30. As is known in the art, an air ionizer utilizes a high voltage to electrically charge the air molecules. The ionizer 35 produces an electrical current and has a continuous stream of air passing therethrough. As the air passes through the ionizer 35 the ionizer 35 functions to sterilize the air so as to reduce the contaminants present therein. While two ionizers 35 are illustrated herein, it is contemplated within the scope of the present invention that the air treatment apparatus 10 could have more or less than two ionizers 35.

The ionizer 35 is operably coupled to the dehumidifier 40. The dehumidifier 40 is a conventional dehumidifier and is operable to reduce the moisture present in the air passing therethrough. The dehumidifier 40 is configured as a conventional dehumidifier having refrigerant cooled coils in the airflow path so when the air passes across the coils the cooled coils cause the air to condense on the coils and as such the air loses its ability to retain moisture and the moisture is extracted therefrom. The dehumidifier 40 includes exit hose 45 that directs air from the dehumidifier 40 to the root support apparatus 90. The air treatment apparatus 10 further includes a second exit hose 145 that is fluidly coupled to a container having a plant therein. As the air treatment apparatus 10 provides temperature controlled air as described herein, it is further contemplated within the scope of the present invention that the air treatment apparatus 10 utilizes hose 145 to provide air to a plant container wherein the hose 145 has an end that is configured to deposit larger volumes of air into a plant container and as such assist in the regulation of the water temperature of water disposed in the plant container.

The housing 12 has disposed therein an air temperature control unit 50. The air temperature control unit 50 is configured to maintain the temperature of the interior volume 20 and as such the air passing through the air treatment apparatus 10. The air temperature control unit 50 is configured to either warm or cool the interior volume 20 depending upon parameters such as but not limited to the environmental temperature and/or the temperature of the air being introduced into the air treatment apparatus 10 via the air intake vents 26. The air treatment apparatus 10 primarily functions to provide dry cool air to the root support apparatus 90. Good growth results have been obtained with certain plants wherein plants being grown in a hydroponic manner had a supply of cool dry air supplied to the plant proximate the root ball of the plant. Dry cold air introduced into the water proximate the root ball of a plant provides an improved development of the roots of the plant and as such the growth of the plant itself. While various temperatures of air are achievable utilizing the air treatment apparatus 10 it is preferred within the scope of the present invention that the air exiting the air treatment apparatus 10 be at a temperature of approximately forty five degrees when delivered to the root support apparatus 90.

Good results have also been achieved delivering an air flow to the root support apparatus 90 that has a higher percentage of oxygen. Superposed the housing 12 proximate the air intake vents 26 is an oxygen concentrator 60. The oxygen concentrator 60 functions to provide a source of purified oxygen into the atmosphere proximate the air intake vents 26. The oxygen concentrator 60 is a conventional oxygen concentrator that is operable to receive air from its surroundings, compress the air, remove the nitrogen using a filter and produce an output of purified oxygen. The oxygen concentrator 60 produces a source of purified oxygen proximate the air intake vents 26 in order to provide an air within the air treatment apparatus 10 that has a higher concentration of air than the standard twenty-one percent found in atmospheric air. Within the scope of the present invention, good results of plant growth have been achieved utilizing the oxygen concentrator 60 to produce an air within the air treatment apparatus 10 that has an oxygen concentration of thirty to forty percent. While not particularly illustrated herein, it is contemplated within the scope of the present invention that the oxygen concentrator 60 could have an alternate hose configured to dispense oxygen into the interior volume 20 of the air treatment apparatus 10. This additional configuration could have a diffusing hose within the interior volume 20 wherein the air pumps 25 could have additional intakes so as to receive air intake from within the interior volume 20 having a higher oxygen concentration.

The air treatment apparatus 10 is includes a power supply 170 that is a conventional power supply and is electrically coupled to a one hundred and twenty volt power source. The power supply 170 is operable to provide the power required to operate the air treatment apparatus 10. The air treatment apparatus 10 further includes a controller 70. The controller 70 is operably coupled to the components of the air treatment apparatus 10 so as to monitor and control parameters such as but not limited to temperature and humidity. The controller 70 is operably coupled to sensors (not illustrated herein) that provide monitoring of the temperature and moisture content of the air being generated by the air treatment apparatus 10. The sensors for temperature and humidity are operably coupled to the intake vent and determine whether or not the air pump 25 should intake external air based on the temperature and the humidity thereof. A user would utilize the controller 70 to program the sensors for a desired temperature and humidity parameter and upon reaching the programmed level the air pumps 25 will intake air from an outside source. The controller 70 further includes a display screen that is configured to display the parameters, which the controller 70 monitors. The controller 70 functions to allow a user to program set-points for parameters such as but not limited to temperature and humidity. It is contemplated within the scope of the present invention that numerous embodiments of the controller either digital or analog could be employed in order to achieve the desired functionality as described herein.

The plant treatment system 100 further includes a dosing unit 110. The dosing unit 110 includes a housing 120 having an interior volume 121 with the foregoing elements disposed therein. The housing 120 is manufactured from a durable suitable material such as but not limited to plastic or metal. Disposed within the housing 120 is a reservoir 130. The reservoir 130 is configured to receive and store therein a liquid plant nutrient. While numerous types of liquid plant nutrients could be stored within the reservoir 130, good results have been achieved utilizing a liquid bacteria concentrate that colonizes the plant rhizosphere. The reservoir 130 is accessed by port 135 that is configured to be accessible from outside of the housing 120 so as to provide a technique for loading liquid bacteria into the reservoir 130. While in the preferred embodiment of the present invention it is desirable that liquid bacteria be deposited into the reservoir 130, it is contemplated within the scope of the present invention that the reservoir 130 could be filled with various alternate liquid nutrients for plants.

Fluidly coupled to the reservoir 130 is pump 140. The pump 140 is configured to transfer a portion of the contents disposed within the reservoir 130 and transfer via tube 145 so as to be deposited into the root support apparatus 90. The pump 140 is a conventional pump that is configured to transfer a liquid from a source to a destination. Those skilled in the art should recognize that the pump 140 could be configured to produce various volumes of fluid output. The dosing unit 110 further includes a climate control module 150. The climate control module 150 is a refrigeration unit that is configured to maintain the interior volume 121 of the dosing unit 110 at a temperature of fifty degrees. Good results have been achieved utilizing a temperature of fifty degrees within the dosing unit 110. The climate control module 150 is a conventional refrigeration unit that is operable to cool the interior volume 121 of the dosing unit 110. The dosing unit 110 is fluidly coupled to the root support apparatus 90 via tube 145 and is configured to deliver fluid proximate the root ball of a plant. While in the preferred embodiment the dosing unit 110 delivers fluid proximate the root ball of a plant it is additionally contemplated that the dosing unit 110 could deposit fluid in alternate locations such as but not limited an upper area of a plant. While not particularly illustrated herein, it is further contemplated within the scope of the present invention that the reservoir 130 of the dosing unit 110 could be configured to utilize replaceable liners and/or disposable containers configured to be placed in the reservoir 130.

The root support apparatus 90 illustrated herein includes a root ball containment cage 91 and delivery tubes 92. The delivery tubes 92 include apertures 93 wherein the apertures 93 function to deliver either air from the air treatment apparatus 10 or liquid nutrients from the dosing unit 110. While not illustrated herein, it is contemplated within the scope of the present invention that the root support apparatus 90 could have air filter stones operably coupled to the delivery tubes 92. The delivery tubes 92 and root ball containment cage 91 are manufactured from a durable material such as but not limited to plastic.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A plant treatment system configured to provide sterilized and temperature controlled to hydroponically growing plants during the lifecycle of the plant comprising:

an air treatment apparatus, said air treatment apparatus having a housing, said housing having a plurality of walls, a top and a bottom integrally connected so as to form an interior volume, said air treatment apparatus having at least one air pump, said at least one air pump configured to receive air from at least one air intake vent, said at least one air intake vent being journaled through said top of said housing of said air treatment apparatus, said at least one air intake vent being operably coupled to said at least one air pump via a tube, said at least one air pump operably coupled to an air ionizer, said air ionizer configured to clean air passing therethrough and place an electric charge thereon;

a dosing unit, said dosing unit having a housing with an interior volume, said dosing unit having a reservoir disposed within the interior volume, said reservoir configured to receive and store a fluid therein, said dosing unit having a pump, said pump being operably coupled to said reservoir;

a temperature control unit, said temperature control unit configured to control temperature within the interior volume of said housing of said air treatment apparatus, said temperature control unit configured to deliver air to said root support apparatus having a temperature of approximately forty five degrees; and a root support apparatus, said root support apparatus configured to provide support for a root ball of a plant, said air treatment apparatus being operably coupled to said root support apparatus so as to deliver air thereto, said air treatment apparatus having a first air pump and a second air pump, said second air pump operable to produce an airflow rate that is greater than that of an airflow rate from said first air pump, wherein the airflow from said first air pump having air with a lower humidity than that of air in a proximate environment, said second air pump producing the airflow so as to provide temperature control to an area proximate roots of the plant, said root support apparatus being fluidly coupled to said dosing unit.

2. The plant treatment system as recited in claim 1, wherein said air treatment apparatus further includes an oxygen concentrator, said oxygen concentrator being superposed the top of said housing of said air treatment apparatus, said oxygen concentrator being proximate the at least one air intake vent.

3. The plant treatment system as recited in claim 2, wherein the air treatment apparatus is operable to produce air and deliver the air to the root treatment apparatus wherein the air has an oxygen concentration between thirty and forty percent.

4. The plant treatment system as recited in claim 3, wherein said air treatment apparatus further includes at least one dehumidifier, said at least one dehumidifier being downstream of said air ionizer and operably coupled thereto, said at least one dehumidifier configured to remove moisture from air passing therethrough.

5. The plant treatment system as recited in claim 4, wherein the dosing unit further includes a climate control module, said climate control module configured to ensure liquid transferred from said reservoir to said root support apparatus has a temperature of approximately fifty degrees.

6. The plant treatment system as recited in claim 5, wherein said air treatment apparatus further includes a controller, said controller operably coupled to said at least one dehumidifier and said temperature control unit, said controller providing an interface to operate said at least one dehumidifier and said temperature control unit.

7. A plant treatment system configured to provide sterilized and temperature controlled to hydroponically growing plants during the lifecycle of the plant comprising:

an air treatment apparatus, said air treatment apparatus having a housing, said housing having a plurality of walls, a top and a bottom integrally connected so as to form an interior volume, said air treatment apparatus having at least one air pump, said at least one air pump configured to receive air from at least one air intake vent, said at least one air intake vent being journaled through said top of said housing of said air treatment apparatus, said at least one air intake vent being operably coupled to said at least one air pump via a tube, said at least one air pump operably coupled to an air ionizer, said air ionizer configured to clean air passing therethrough and place an electric charge thereon, said air treatment apparatus further including at least one dehumidifier, said at least one dehumidifier being downstream of said air ionizer and operably coupled thereto, said at least one dehumidifier configured to remove moisture from air passing therethrough, said air treatment apparatus further having an oxygen concentrator, said oxygen concentrator being superposed the top of said housing of said air treatment apparatus, said oxygen concentrator being proximate the at least one air intake vent;

a dosing unit, said dosing unit having a housing with an interior volume, said dosing unit having a reservoir disposed within the interior volume, said reservoir configured to receive and store a fluid therein, said dosing unit having a pump, said pump being operably coupled to said reservoir;

a temperature control unit, said temperature control unit configured to control temperature within the interior volume of said housing of said air treatment apparatus, said temperature control unit configured to deliver air to said root support apparatus having a temperature of approximately forty five degrees; and a root support apparatus, said root support apparatus having a root ball containment cage and a plurality of delivery tubes, said plurality of delivery tubes being operably coupled to said air treatment apparatus and said dosing unit, said air treatment apparatus having a first air pump and a second air pump, said second air pump operable to produce an airflow rate that is greater than that of an airflow rate from said first air pump, wherein the airflow from said first air pump having air with a lower humidity than that of air in a proximate environment, said second air pump producing the airflow so as to provide temperature control to an area proximate roots of the plant, said root support apparatus configured to provide support for a root ball of a plant.

8. The plant treatment system as recited in claim 7, wherein the air treatment apparatus is operable to produce air and deliver the air to the root treatment apparatus wherein the air has an oxygen concentration between thirty and forty percent.

9. The plant treatment system as recited in claim 8, wherein the dosing unit further includes a climate control module, said climate control module configured to ensure liquid transferred from said reservoir to said root support apparatus has a temperature of approximately fifty degrees.

10. The plant treatment system as recited in claim 9, wherein said air treatment apparatus further includes a controller, said controller operably coupled to said at least one dehumidifier and said temperature control unit, said controller providing an interface to operate said at least one dehumidifier and said temperature control unit.

11. The plant treatment system as recited in claim 10, wherein the at least one air pump is mounted within the interior volume of the air treatment apparatus utilizing rubber isolation mounts.

\* \* \* \* \*